United States Patent
Ng

(10) Patent No.: US 9,772,975 B2
(45) Date of Patent: Sep. 26, 2017

(54) HYBRID TABLE-LOOKUP ALGORITHM FOR FUNCTIONS

(71) Applicant: Oracle International Corporation, Redwood Shores, CA (US)

(72) Inventor: Kwok-Choi Ng, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 179 days.

(21) Appl. No.: 14/790,852

(22) Filed: Jul. 2, 2015

(65) Prior Publication Data

US 2017/0004111 A1    Jan. 5, 2017

(51) Int. Cl.
*G06F 1/03* (2006.01)
*G06F 17/17* (2006.01)
*G06F 7/00* (2006.01)

(52) U.S. Cl.
CPC ........... *G06F 17/17* (2013.01); *G06F 7/00* (2013.01)

(58) Field of Classification Search
None
See application file for complete search history.

(56) References Cited

U.S. PATENT DOCUMENTS

| | | | | |
|---|---|---|---|---|
| 7,509,363 B2 * | 3/2009 | Clifton | ............ | G06F 1/0356 708/272 |
| 8,682,950 B2 * | 3/2014 | Yang | ............ | G06F 7/724 708/200 |
| 2007/0061389 A1 * | 3/2007 | Hussain | ............ | G06F 7/556 708/277 |
| 2013/0339564 A1 * | 12/2013 | Nogueira | ............ | G06F 13/36 710/305 |
| 2014/0222883 A1 * | 8/2014 | Pineiro | ............ | G06F 1/02 708/523 |
| 2017/0004111 A1 * | 1/2017 | Ng | ............ | G06F 17/17 |

OTHER PUBLICATIONS

Chevillard, S. et al., "Computation of the error function erf in arbitrary precision with correct rounding", ENSS Lyon, INRIA. 2006 (10 pages).

(Continued)

*Primary Examiner* — David H Malzahn
(74) *Attorney, Agent, or Firm* — Osha Liang LLP

(57) ABSTRACT

A method and system for approximating functions, including a function approximation repository, which includes a hybrid lookup table configured to store coefficients associated with polynomials in factored form (PFFs), and a results store configured to store results. The system also includes a function approximation device that includes two processors, memory, an IO module and a function approximation module, which includes functionality to receive a request to approximate the function for an argument; verify that the argument falls within a function interval; perform a determination to find a subinterval in which the argument falls; select a PFF associated with the subinterval; obtain PFF coefficients associated with the PFF from the hybrid lookup table; evaluate the PFF using the PFF coefficients and the argument to obtain a result; store the result in the results store; and return the result as an answer to the requesting entity via the IO module.

20 Claims, 6 Drawing Sheets

(56) References Cited

OTHER PUBLICATIONS

Kramer, W. et al., "Algorithms with Guaranteed Error Bounds for the Error Function and the Comlementary Error Function", Wissenschaftliches Technen/Softwaretechnologie, 2000. (46 pages).
Olabiyl, O., "New exponential-type approximations for the erfc(.) and erfcp(.) functions with applications", Prairie View, TX. Aug. 27-31, 2012. (1 page) <http:ieeexplore.ieee.org/xpl/articleDetails.jsp?tp=&arnumber=6314381>.
Tang, P.T.P., "Table-lookup algorithms for elementary functions and their error analysis", Argonne Nat. Lab., IL. Jun. 26-28, 1991 (1 page) <http://ieeexplore.ieee.org/xpl/login.jsp?tp=&arnumber=145565>.
Selvakumar, C.R., "Approximations to complementary error function by method of least squares", Madras, India. Apr. 1982. (1 page) <http://ieeexplore.ieee.org/xpl/articleDetails.jsp?tp=&arnumber=1456589>.
Winitzki, Serge, "Uniform approximations for transcendental functions", The Pennsylvania State University, 2007 (1 page) <http://citeseerx.ist.psu.edu/viewdoc/summary?doi=10.1.1.90.6481>.

\* cited by examiner

| Table of PFF Coefficients for Erf [0, 0.75] | |
|---|---|
| $A_0$ | -9.152987280250658957796161541153878715704195201 40e-0006 |
| $A_1$ | 2.214609591434637869472243365542851734062423929 57e-0005 |
| $A_2$ | 4.413562124342497572219469470500285979142063297 33e-0006 |
| $A_3$ | 1.192793428397318932195959352571268397014137008 23e-0006 |
| $A_4$ | 1.099213557083729782252079672233424645355626125 82e-0007 |
| $A_5$ | 1.147560756925732329855666874858260333347459436 482e-0008 |
| $A_6$ | -1.402593089717446309805382043123245239257812500 00e+0004 |
| $A_7$ | 7.156874153683225813438184559345245361328125000 000e+0003 |
| $A_8$ | -1.774875472253922907839296385645866394042968750 00e+0003 |
| $A_9$ | 2.640535399004985492865671403706073760986328125 00e+0002 |
| $A_{10}$ | -2.347022113408004884149704594165086746215820312 50e+0001 |

FIG. 3B

HYBRID TABLE-LOOKUP ALGORITHM FOR FUNCTIONS

BACKGROUND

A function is a mathematical relationship between a set of inputs and corresponding permissible outputs. Various types of functions are used in a variety of applications (e.g., bit error rate calculations, heat equation solutions, geologic modeling, statistics, etc.). Examples of such useful functions include, but are not limited to, the error function, the complementary error function, and elementary functions (e.g., logarithmic, exponential, power, trigonometric, etc.). Often, rather than precise solutions to such functions, applications require approximate solutions. For example, a solution may be acceptable as long as the solution falls within an acceptable range of error. Computing devices are often used to calculate approximate solutions to functions for use in applications of the function. Without regard for the underlying hardware of a computing device, such a calculation may occur in a less efficient manner (e.g., take longer, require more processor cycles, etc.) than may otherwise be possible.

SUMMARY

In general, in one aspect, the invention relates to a system for approximating a function that includes a function approximation repository, which includes a hybrid lookup table configured to store a plurality of coefficients associated with a plurality of polynomials in factored form (PFFs), and a results store configured to store a plurality of results. The system also includes a function approximation device that includes a first processor, a second processor, a memory, an input/output (IO) module and a function approximation module. The function approximation module is configured to receive a request to approximate the function for an argument from a requesting entity; verify that the argument falls within a function interval that includes a plurality of subintervals; perform a determination to find a subinterval of the plurality of subintervals in which the argument falls; select, based on the determination, a PFF associated with the subinterval; obtain PFF coefficients associated with the PFF from the hybrid lookup table; evaluate the PFF using the PFF coefficients and the argument to obtain a result; store the result in the results store; and return the result as an answer to the requesting entity via the IO module.

In general, in one aspect, the invention relates to a non-transitory computer readable medium storing instructions which, when executed by a processor, cause the processor to configure a function approximation module of a function approximation device to approximate a result and return the result as an answer to a request to approximate a function for an argument; receive at the function approximation module, from a requesting entity, the request to approximate the function for the argument; verify, by the function approximation module, that the argument falls within a function interval that includes a plurality of subintervals; perform, by the function approximation module, a determination to find a subinterval of the plurality of subintervals in which the argument falls; select, by the function approximation module and based on the determination, a polynomial in factored form (PFF) associated with the subinterval; obtain PFF coefficients associated with the PFF from a hybrid lookup table; evaluate the PFF using the PFF coefficients and the argument to obtain a result. A first factor of the PFF is evaluated using a first processor of the function approximation device to obtain a first factor result, a second factor of the PFF is evaluated using a second processor of the function approximation device to obtain a second factor result, and the first factor result is multiplied by the second factor result to obtain the result, which is stored the result in a function approximation repository and returned to the requesting entity as the answer via an input/output (IO) module.

In general, in one aspect, the invention relates to a method for approximating a function that includes configuring a function approximation module of a function approximation device to approximate a result and return the result as an answer to a request to approximate the function for an argument; receiving at the function approximation module, from a requesting entity, the request to approximate the function for the argument; verifying, by the function approximation module, that the argument falls within a function interval that includes a plurality of subintervals; performing, by the function approximation module, a determination to find a subinterval of the plurality of subintervals in which the argument falls; selecting, by the function approximation module and based on the determination, a polynomial in factored form (PFF) associated with the subinterval; obtaining PFF coefficients associated with the PFF from a hybrid lookup table; evaluating the PFF using the PFF coefficients and the argument to obtain a result. A first factor of the PFF is evaluated using a first processor of the function approximation device to obtain a first factor result, a second factor of the PFF is evaluated using a second processor of the function approximation device to obtain a second factor result, and the first factor result is multiplied by the second factor result to obtain the result. The method also includes storing the result in a function approximation repository; and returning the result to the requesting entity as the answer via an input/output (IO) module.

Other aspects of the invention will be apparent from the following description and the appended claims.

BRIEF DESCRIPTION OF DRAWINGS

FIGS. 3A and 3B show an example in accordance with one or more embodiments of the invention.

DETAILED DESCRIPTION

Figure 1:
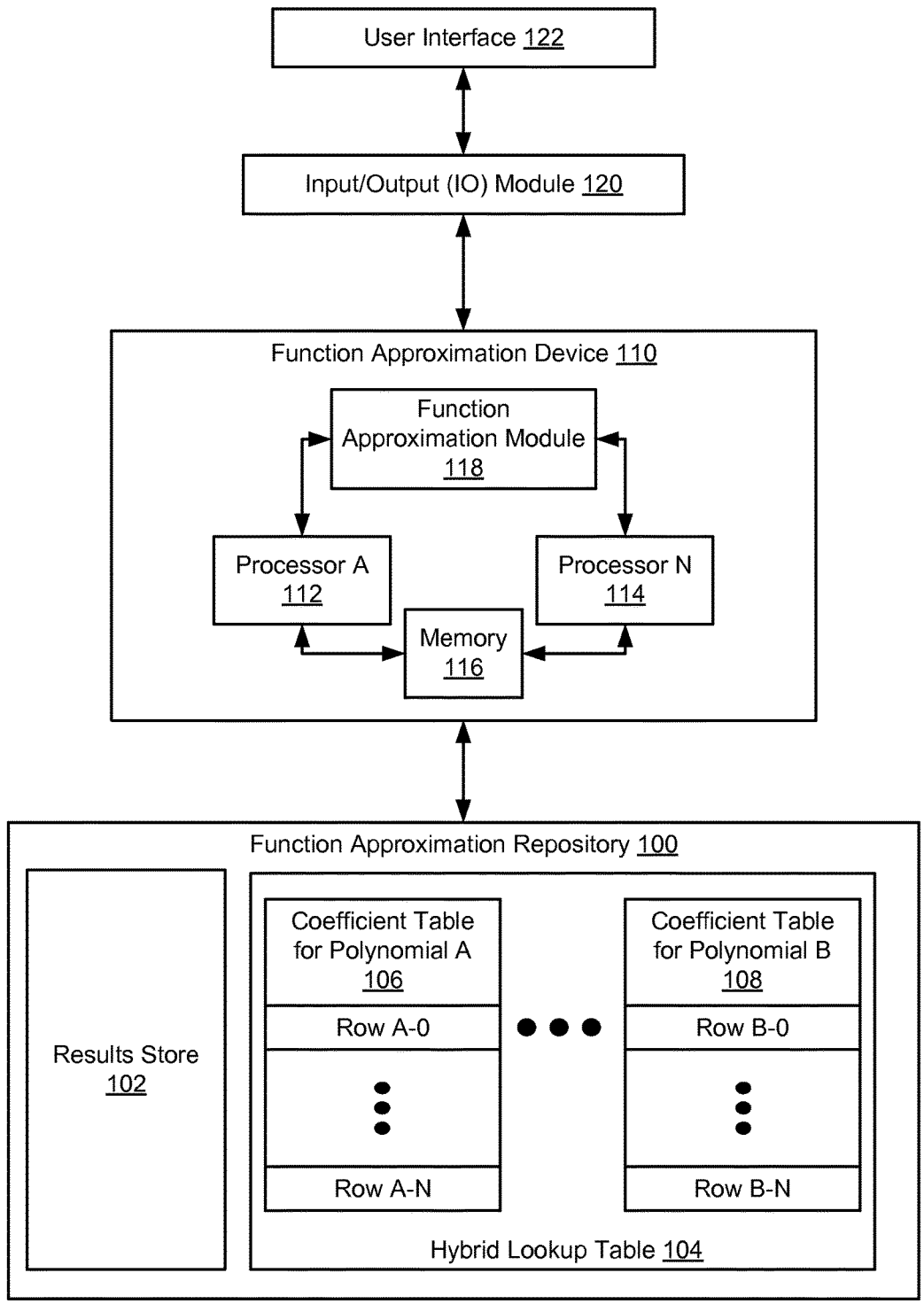
FIG. 1 shows a system in accordance with one or more embodiments of the invention.

Specific embodiments of the invention will now be described in detail with reference to the accompanying figures. Like elements in the various figures may be denoted by like names and/or like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to approximation of functions using one or more function approximation devices. Specifically, the invention relates to the use of one or more polynomials in factored forms (PFFs), one or more hybrid lookup tables, and the underlying hardware of a function approximation device capable of executing multiple instruction sequences concurrently (e.g., multi-processor computing devices, computing devices with one or more multi-core processors, etc.) in order to approximate one or more solutions to one or more functions. In one or more embodiments of the invention, a solution is called a result. Additionally, in one or more embodiments of the invention the result is returned to an entity that requested the function approximation (e.g., a user, a process, a thread, an application, etc.) via an output module as an answer to the request.

FIG. 1 shows a block diagram of a system in accordance with one or more embodiments of the invention. Specifically, in one or more embodiments of the invention, the system includes a function approximation repository (100), a function approximation device (110), and an input/output (IO) module (120). The function approximation repository (100) may include a results store (102) and a hybrid lookup table (104). The hybrid lookup table (104) may include one or more coefficient tables corresponding to one or more polynomials in factored form (PFF) (e.g., coefficient table for polynomial A (106), coefficient table for polynomial N (108)). The function approximation device may include processors (e.g., processor A (112), processor N (114)), memory (116), and a function approximation module (118). The IO module (120) may include and/or be operatively connected to a user interface (122). Each of the aforementioned components is described below.

In one or more embodiments of the invention, a function approximation repository (100) is a data repository. In one or more embodiments of the invention, a data repository is any type of storage unit and/or device (e.g., a file system, database, collection of tables, or any other storage mechanism) for storing data/information. Specifically, the function approximation repository (100) may include hardware and/or software. Further, the function approximation repository (100) may include a single or multiple different storage units and/or devices. The multiple different storage units and/or devices may or may not be of the same type or located at the same physical site. In one or more embodiments of the invention, the function approximation repository (100) is included as a part of the function approximation device (110). In other embodiments of the invention, the function approximation repository (100) is a stand-alone repository that is operatively connected to and accessed by, at least, the function approximation device (110) (e.g., via a storage adapter interface).

In one or more embodiments of the invention, the function approximation repository (100) includes a results store (102). In one or more embodiments of the invention, the results store (102) is any data construct designed to store results of calculations performed by one or more processors (e.g., processor A (112), processor N (114)) of a function approximation device (110). For example, the results store (102) may be implemented as a table into which a processor stores calculation results associated along with other information (e.g., information associated with the entity that requested the calculation to be performed). In one or more embodiments of the invention, the results store (102) includes functionality to store approximated solutions to functions as results. For example, if a user requests an approximated solution to the error function for a given argument, a processor (e.g., processor A (112), processor N (114)) of a function approximation device (110) may execute one or more write instructions to store the approximated solution to the error function for that argument as a result in the results store (102).

In one or more embodiments of the invention, the function approximation repository (100) includes a hybrid lookup table (104). In one or more embodiments of the invention, a hybrid lookup table (104) is any data construct capable of storing coefficient values corresponding to one or more polynomials in factored form (PFFs). The coefficient values may be referred to as PFF coefficients.

In one or more embodiments of the invention, a polynomial is an expression that includes variables and coefficients operated on via addition, subtraction, multiplication, and non-negative integer exponents. A polynomial may be factored to obtain a PFF. Factoring a polynomial may include determining one or more smaller (e.g., lower degree) polynomials which, when multiplied, are equivalent to the original polynomial. A PFF may include one or more terms which include a variable or are constant. Such terms may be expressed in the PFF to include a multiplicative factor (e.g., a number) which may be called a coefficient. As an example, the hybrid lookup table (104) may be implemented as a table and/or collection of tables (e.g., coefficient table for polynomial A (106), coefficient table for polynomial N (108)) in which each row or column (e.g., row A-0, row A-N, row B-0, row B-N) has an entry for a unique PFF (not shown) along with entries for one or more coefficients (not shown) corresponding to each term in the PFF.

In one or more embodiments of the invention, the function approximation repository (100) is included in and/or operatively connected to a function approximation device (110). In one or more embodiments of the invention, the function approximation device (110) is a computing device. In one or more embodiments of the invention, a computing device is any device and/or any set of devices capable of electronically processing instructions and that includes at least the minimum processing power (e.g., multiple processors), memory, and input and output device(s) in order to contribute to the performance of at least some portion of the functions described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, or any other mobile computing device), and/or any other type of computing device with the aforementioned minimum requirements.

In one or more embodiments of the invention, the function approximation device (110) includes processors (e.g., processor A (112), processor N (114)). In one or more embodiments of the invention, a processor is hardware capable of executing sequences of instructions (e.g., that are stored in operatively connected memory) in order to perform operations on or otherwise manipulate data. For example, a processor may be made of silicon subjected to a fabrication process by which various circuitry components (e.g., transistors) are created in various regions of a silicon wafer. In one or more embodiments of the invention, the function approximation device (110) includes at least two processors (e.g., processor A (112), processor N (114)).

In one or more embodiments of the invention, each processor (e.g., processor A (112), processor N (114)) is operatively connected to memory (116). In one or more embodiments of the invention, memory is any hardware configured to store data and/or instructions permanently and/or temporarily. Examples of memory include, but are not limited to, random access memory (RAM), cache memory, flash memory, or any other type of memory capable of storing data and/or instructions. In one or more embodiments of the invention, memory may include multiple different memory units and/or devices. The multiple different memory units and/or devices may or may not be of the same type, located at the same physical site, and/or co-located with one or more operatively connected processors (e.g., processor A (112), processor N (114)). In one or more embodiments of the invention, the memory (116) is included as a part of the function approximation device (110). In other embodiments of the invention, the memory (116) is stand-alone memory that is operatively connected to and accessed by, at least, the function approximation device (110). In one or more embodiments of the invention, the memory includes one or more separate memory banks, each associated with at least one processor. For example, each processor in a computing device may have corresponding memory banks arranged as a part of a non-uniform memory access (NUMA) architecture.

In one or more embodiments of the invention, the function approximation device (110) includes a function approximation module (118). In one or more embodiments of the invention, the function approximation module (118) includes hardware (e.g., circuitry), software, firmware, or any combination thereof, that includes functionality to perform at least some functions described herein in accordance with one or more embodiments of the invention. For example, the function approximation module (118) may be a specialized software application, or a portion thereof, executing on the function approximation device (110).

In one or more embodiments of the invention, the function approximation module (118) is, at least in part, a software application, or a portion thereof, written in any programming language that includes instructions stored on a non-transitory computer readable medium which, when executed by one or more processors in a computing device, enable the computing device to perform the functions described in accordance with one or more embodiments of the invention.

In one or more embodiments of the invention, the function approximation device (110) includes and/or is operatively connected to an IO module (120). In one or more embodiments of the invention, an IO module (120) is any module capable of accepting input to and/or transmitting output from a computing device (e.g., function approximation device (110)). Examples if IO devices include, but are not limited to, a touchscreen, a keyboard, a mouse, a microphone, a touchpad, an electronic pen, a screen (e.g., a liquid crystal display (LCD), a plasma display, touchscreen, cathode ray tube (CRT) monitor, projector, or other display device), a printer, external storage, network adapters, and storage adapters.

In one or more embodiments of the invention, the IO module (120) includes a user interface (122). In one or more embodiments of the invention, a user interface (122) is hardware (e.g., circuitry, optical transceiver, etc.), software, firmware, and/or any combination thereof by which (not shown) a user may interact with the function approximation device (110). A user may be any entity (e.g., a person, another device, a software application, etc.) capable or requesting, as an answer, a solution to a function for a given argument, and/or receiving said answer from a function approximation device. For example, a user interface (122) may be a touchscreen that includes fields for entering necessary information to convey a function and an argument to the function approximation device and is also capable of receiving, as an answer from the function approximation device via the IO module (120), a solution to a function at a given argument. For another example, a user may be another application executing on a computing device and the user interface may be a library call that invokes the function approximation module to obtain, as an answer, a solution to a function at a given argument.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, although FIG. 1 shows a function approximation device with two processors, one of ordinary skill in the art, having the benefit of this disclosure, will recognize that any number of processors may be included in the function approximation device, provided that at least two streams of instructions may be executed concurrently.

As an example, the function approximation device may include a single processor that includes more than one processing cores and/or incorporates hyper threading. As another example, the function approximation device may be a server that includes ninety-six processors.

Also, although FIG. 1 shows the results store and the hybrid lookup table as a part of the same data repository, in fact be more than one data repository may exist, each one storing all or a part of the results store, the hybrid lookup table, and/or any combination thereof. Accordingly, embodiments of the invention should not be considered limited to the specific arrangements of modules and elements shown in FIG. 1.

Figure 2A:
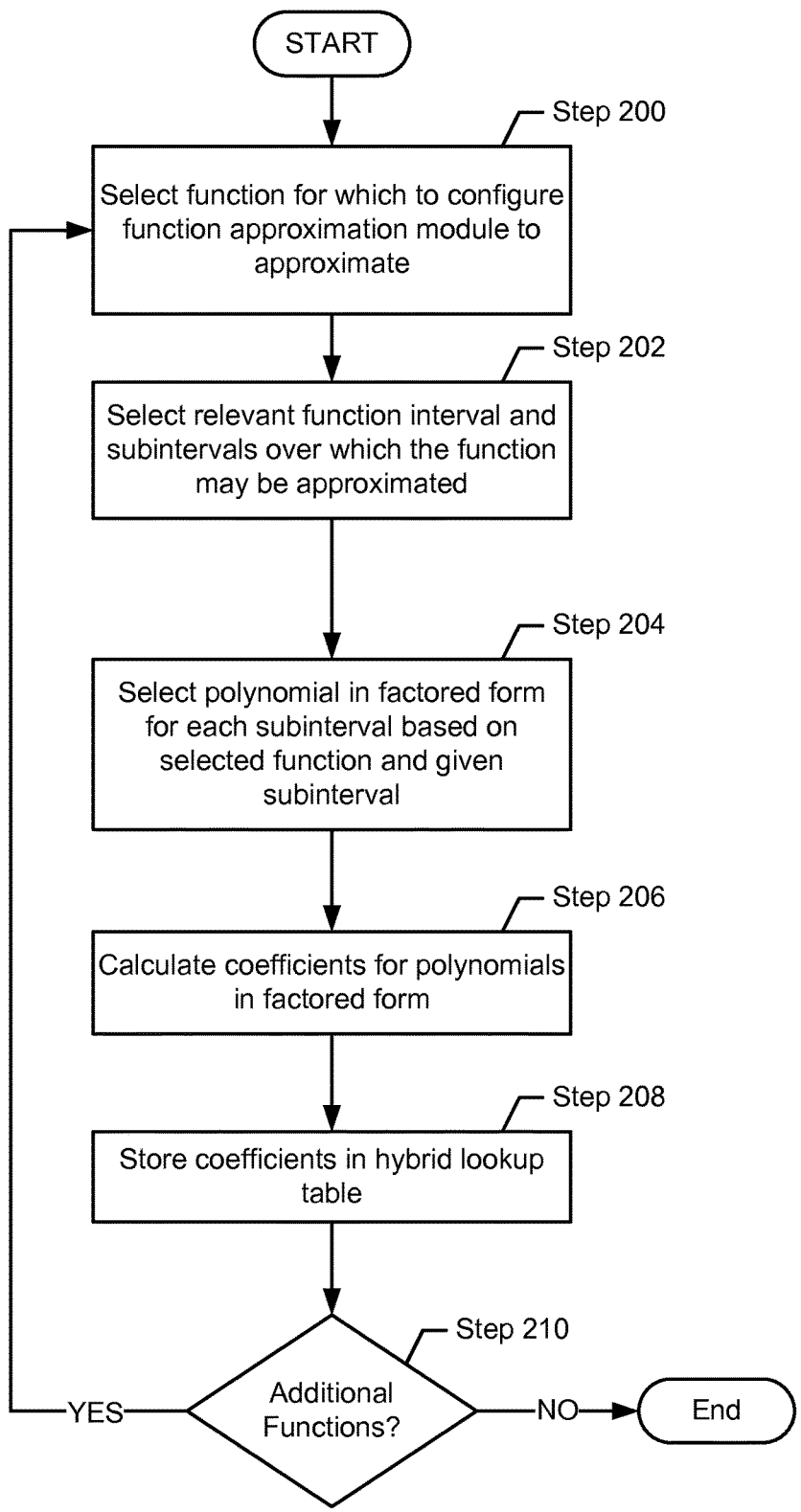
FIGS. 2A and 2B show flowcharts in accordance with one or more embodiments of the invention.
Figure 2B:
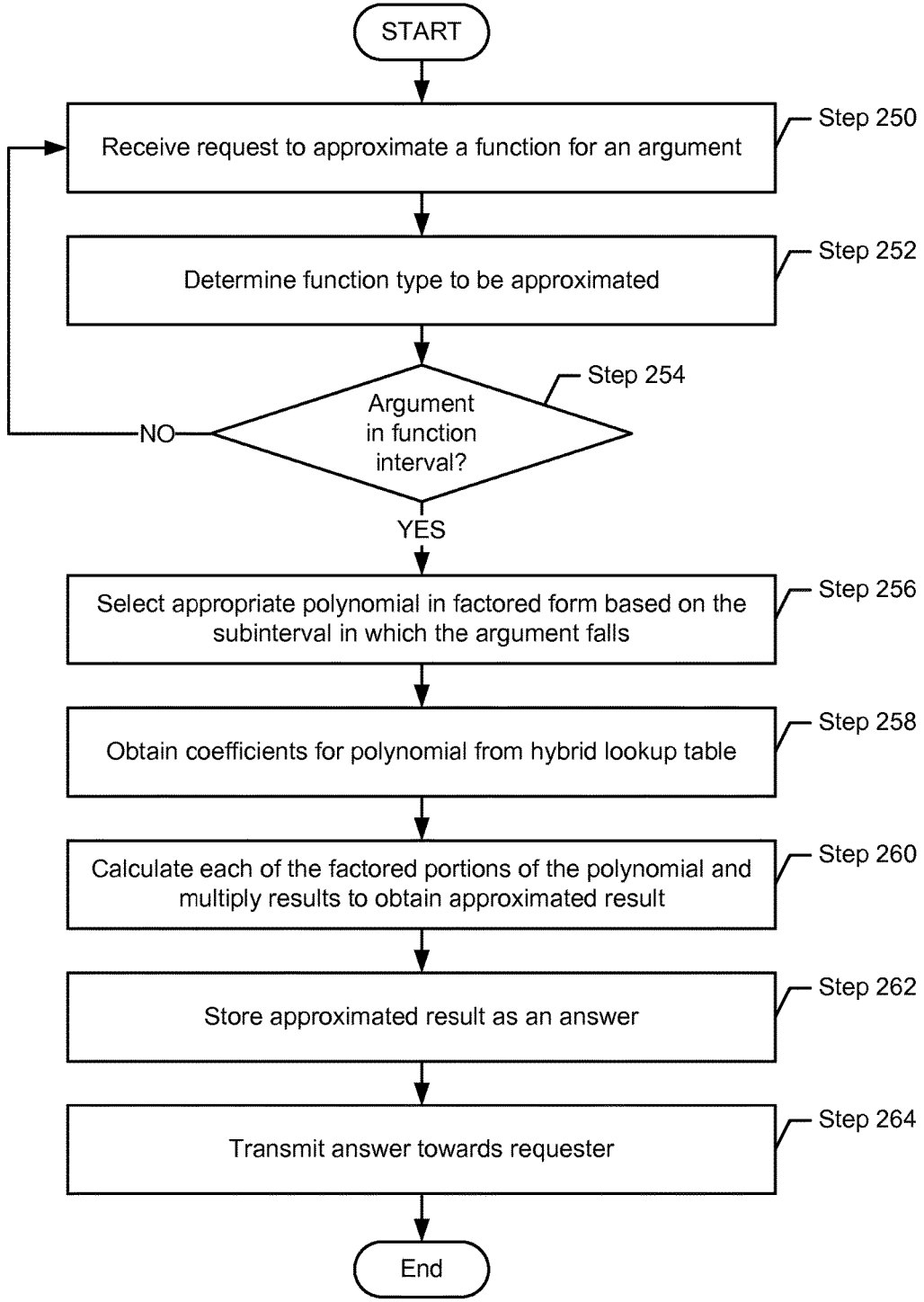

FIG. 2A and FIG. 2B show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2A shows a flowchart describing a method for configuring a function approximation module in accordance with one or more embodiments of the invention. In Step 200, one or more functions are selected for which to configure the function approximation module. In one or more embodiments of the invention, the function approximation module may be configured for any number of functions. In one or more embodiments of the invention, the function approximation module may be configured for any function which may be approximated. For example, the function approximation module may be configured to approximate the error function and the complementary error function. As another example, the function approximation module may be configured to approximate each of the trigonometric functions (e.g., sine, cosine, tangent, cosecant, secant, and cotangent).

In one or more embodiments of the invention, the function may be selected via receiving a request from an entity for an approximation of a function for a given argument, in which case the received function is selected. In other embodiments of the invention, one or more functions are selected for which to configure the function approximation module based on the intended application of the function approximation device. For example, if the function approximation device is to be used for calculating the error function and complementary error function for given values, then the error function and the complementary error function are selected as the functions for which the function approximation module is configured.

In Step 202, a relevant function interval is selected for each function selected in Step 200, along with two or more subintervals. In one or more embodiments of the invention, the relevant function interval is an interval that includes arguments for which an entity may request approximation of the function and may be determined, in part, by the properties of the function. For example, the error function yields a result of one when approximated for any value greater than six using Institute of Electrical and Electronic Engineers (IEEE) double precision arithmetic, and is valid for positive arguments. Therefore a relevant function interval for the error function may be between zero and six.

In one or more embodiments of the invention, the two or more subintervals are also selected based on the characteristics of the function and a desired accuracy level within which function approximations should be to satisfy the requirements of the application of the function approximation device. Continuing the previous example, in order to meet the accuracy requirements when deploying the function approximation device in statistical analysis scenarios, the range between zero and six for the error function may be broken up into a first interval between zero and three-fourths, with twenty-one subsequent subintervals, each with a width of one-fourth.

In Step 204, a PFF is selected for each subinterval selected in Step 202. In one or more embodiments of the invention, the PFF selected for each subinterval is based on both the selected function and the given subinterval. In one or more embodiments of the invention, the PFF selected for each interval is of the same degree. In one or more embodiments of the invention, the PFF selected for each subinterval is also based on a desired level of approximation accuracy (e.g., maximum error measured via units-in-the-last-place (ULPs) and/or via relative error). For example, for the error function and the subinterval between zero and three-fourths, the following PFF may be selected:

$$\mathrm{erf}(x) = x + x^* Q_1(z)^* Q_2(z), \text{ where } z = x^* x$$

In Step 206, coefficients are calculated for the PFF. In one or more embodiments of the invention, the coefficients are calculated using any method of obtaining polynomial coefficients. One non-limiting example of a method for obtaining coefficients of a PFF is to calculate the coefficients using a Remez algorithm and corresponding error. In one or more embodiments of the invention, the Remez algorithm is used to iteratively determine the coefficients of one or more PFFs.

In Step 208, the coefficients obtained in Step 208 are stored in a hybrid lookup table. In one or more embodiments of the invention, storing the coefficients includes identifying and/or creating a coefficient table, or portion thereof, corresponding to each PFF for which coefficients were obtained and storing the coefficient values in the table. In one or more embodiments of the invention, each coefficient table is a subset of the larger hybrid lookup table.

For example, each PFF may have an associated row or column of coefficients. In such an example, the aggregate of all rows or columns corresponding to a PFF may be the hybrid lookup table. In one or more embodiments of the invention, storing the coefficients includes execution, by one or more processors, of one or more write operations that modify a storage medium in order to store the coefficient values. For example, a write operation may cause various regions of a region of silicon to be biased such that they are machine readable as either a one or a zero, with the coefficient represented by an appropriate string of ones and zeros required to represent the coefficient (e.g., as a binary number, a floating point number, etc.).

In Step 210, a determination is made as to whether there are any additional functions for which the function approximation module is to be configured to approximate. If there are additional functions to configure, the process returns to Step 200. If there are no additional functions to configure, the process proceeds to end.

FIG. 2B shows a flowchart describing a method for approximating a function using a function approximation device in accordance with one or more embodiments of the invention. In Step 250, a request is received to approximate a function for an argument. For example, the request may be to approximate the error function for an argument of four-fifths (i.e., erf(0.8)). In one or more embodiments of the invention, the request is received from a user of the function approximation device via an IO module. In one or more embodiments of the invention, the request is received from a software application, process, thread, etc. which requires an approximation of the function in order to perform at least a part of the application's functionality. For example, a statistics analysis application may require approximation of the error function at a given argument in order to provide a user of the application with data related to the statistical analysis that a user is using the application to perform.

In Step 252, the type of function for which an approximation is requested is determined. In one or more embodiments of the invention, determining what type of function is to be approximated includes assessing the request received in Step 250 to obtain the function type. For example, an assessment of the request may yield that an approximation is being requested for the complementary error function, or the cosine function, etc.

In Step 254, a determination is made as to whether the argument for which the function is to be approximated falls within the function interval associated with the function type determined in Step 252. In one or more embodiments of the invention, the determination is made by performing a comparison (e.g., using one or more comparators) between the received argument and the pre-determined interval that corresponds to the function. For example, if a request is received to approximate the error function at for an argument of nine-tenths, and the function interval associated with the error function is the interval from zero to six, a comparison between the argument and the range would yield a positive result indicating that the argument falls within the range. In the event that an argument does not fall within the function range, then the function approximation device will be unable to approximate a result of the function and therefore the process returns to Step 250 to await a new request. In the event that the argument does fall within the function range, then the process proceeds to Step 256.

In Step 256, a PFF is selected based on a subinterval of the function interval in which the argument falls. In one or more embodiments of the invention, the function interval is divided into two or more non-overlapping subintervals into one of which any argument within the function range must necessarily fall. Determining the subinterval in which an argument falls may include a comparison of the argument with the two or more subintervals until a result is obtained indicating that the argument is within the subinterval. For example, if an approximation of the error function for an argument of nine-tenths was received in Step 250, then the argument may be determined to fall within a subinterval bounded by three-fourths and one. In one or more embodiments of the invention, once a subinterval has been determined, the PFF corresponding to the subinterval for the function type determined in Step 252 may be obtained.

In Step 258, coefficients are obtained for the PFF obtained in Step 256. In one or more embodiments of the invention, the coefficients are obtained from the hybrid lookup table. In one or more embodiments of the invention, obtaining the coefficients includes using the obtained PFF (e.g., as an index) to determine a location within the hybrid lookup table where the coefficients are stored. For example, the PFF may be associated with a row or column value of a table and the corresponding coefficients for the PFF may be stored in the identified row or column.

In Step 260, each of the factors of the PFF is calculated using the coefficients obtained in Step 258. In one or more embodiments of the invention, the function approximation module includes functionality to direct the function approximation device such that each factor of the PFF is calculated by a processor in separate instruction execution streams. For example, if a PFF includes two factors, the function approximation module may cause the first factor to be calculated using a first processor of a function calculation device and the second factor to be calculated using a second processor of the function calculation device. In one or more embodiments of the invention, function approximation module includes functionality to receive from each of the separate instruction execution streams the results of the calculations of each of the factors of the PFF, and to multiply the factors together in order to obtain, at least in part, a result (i.e., an approximated evaluation of the given function at the requested argument).

In Step 262, the result obtained in Step 260 is stored (e.g., in a results store of a function approximation repository). In one or more embodiments of the invention, storing the result includes executing, by one or more processors, one or more write instructions causing a storage medium to be modified such that it includes the approximated result. The approximated result may be associated (e.g., via the function approximation module) with the request received in Step 250. In one or more embodiments of the invention, the approximated result is called an answer (i.e., an answer to the query posed in the request to approximate a function for a given argument).

In Step 264, the answer stored in Step 262 is transmitted towards the requester. In one or more embodiments of the invention, the answer is transmitted to the requester via any potential scheme by which data may be transmitted from one entity to another. For example, if the requester was an application executing on a computing device that is also hosting the function calculation module, memory and/or storage operatively connected to the computing device and accessible by the requesting application may be modified to include the answer. As another example, if the request was received at the function approximation device via a network (e.g., the Internet), then the answer may be transmitted towards the requesting user via the IO module operatively connected to and/or included in the function approximation device (e.g., a network interface card).

Figure 3A:
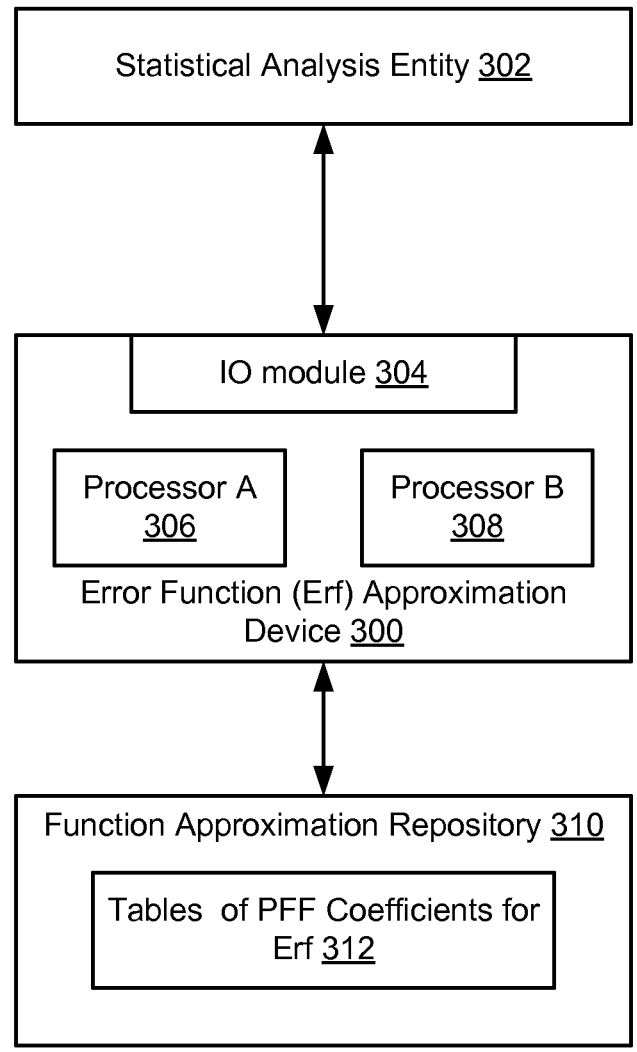

FIG. 3A and FIG. 3B show an example in accordance with one or more embodiments of the invention. The following example is for explanatory purposes only and not intended to limit the scope of the invention.

Referring to FIG. 3A, consider a scenario in which a statistical analysis entity (302) (e.g., a statistician, a statistical analysis program, etc.) has access to and/or is operatively connected (e.g., via a network) to an error function (erf) approximation device (300). The erf approximation device (300) includes two processors (e.g., processor A (306), processor B (308)), and IO module (304), and a function approximation module (not shown). The erf approximation device (300) is operatively connected (e.g., via a storage adapter) to a function approximation repository (310). The function approximation repository (310) is stored in a redundant array of independent disks (RAID) six array located in a disk enclosure. The function approximation repository (310) includes twenty-two tables, each storing one or more coefficient values corresponding to a PFF associated with the erf function. The function approximation module (not shown) of the erf approximation device (300) has been previously configured to approximate solutions for a given argument for the erf function over a range from zero to six (configuration steps are described above in the description of FIG. 2A). Configuration of the function approximation module included deciding on a first subinterval (zero to 0.75) as well as an additional twenty-one subintervals, each with a width of 0.25. Configuration also included selecting a PFF for each subinterval and then using the Remez algorithm in order to calculate coefficients corresponding to each PFF. The coefficients for each PFF are stored in the Tables of PFF Coefficients for Erf (312) in the function approximation repository (310).

In such a scenario, the statistical analysis entity (302) needs to determine the probability that a measurement is less than the value 0.72 (e.g., from the normalized mean value). The population being analyzed includes a large number of sample measurements of length that are normally distributed. Therefore, the statistics analysis entity transmits a request to the erf approximation device that includes a request to approximate a solution to the erf function for an argument of 0.72 and provide the solution as an answer.

Once the erf approximation device (300) received the request to approximate the erf function at 0.72, the erf approximation device first assesses the request to determine that the erf function is the function for which an answer is requested. The erf approximation device (300) then performs a check that verifies that the erf approximation device is configured to approximate solutions for the erf function. Next, the erf approximation device (300) performs a check to determine that the argument provided (0.72) in the request is within the function interval for the erf function for which the function approximation module is configured (i.e., between zero and six). After successful determination that the argument is within the function interval, the argument value is used to select the first subinterval, because 0.72 falls within the subinterval from zero to 0.75.

After the subinterval is selected, the erf approximation device selects the PFF associated with the subinterval. In the current example, the following PFF is used:

$$\text{erf}(x) \approx x + x^* Q_1(z)^* Q_2(z), \text{ where } z = x^* x$$

where $$Q_1(x) = A_0 + A_1 z + A_2 z^2 + A_3 z^3 + A_4 z^4 + A_5 z^5$$

and $$Q_2(x) = A_6 + A_7 z + A_8 z^2 A_9 z^3 A_{10} z^4 + z^5$$

Once the appropriate subinterval has been determined and the relevant PFF selected, the erf approximation device obtains the appropriate coefficients (e.g., Tables of PFF Coefficients for Erf (312)) from the function approximation repository (310), which includes $A_0$ through $A_{10}$ for the selected PFF. FIG. 3B shows the Table of Coefficients for Erf for the range [0, 0.75].

Next, a value for z is obtained by squaring the argument received in the request (e.g., $z = x^* x = x_2 = (0.72)^2 = 0.5184$). Then, using the obtained coefficients $A_0$ through $A_{10}$ (e.g., the coefficients seen in FIG. 3B) along with the value of z, each of the factors of the PFF may be calculated. To that end, the function approximation module (not shown) causes first factor (i.e., $Q_1(x)$) to be evaluated in a first instruction stream executing on processor A (306) and the second factor (i.e., $Q_2(x)$) to be evaluated in a second instruction stream executing on processor B (308). The direction of factors to different processors allows the calculations to occur concurrently, and may therefore increase the overall efficiency of the approximation by, for example, reducing the amount of time the approximation takes.

After $Q_1(x)$ has been calculated via processor A (306) and $Q_2(x)$ has been evaluated via processor B (308), the function approximation module uses the results to calculate an approximate solution to the error function for 0.72. Specifically, the calculated results are used in the above recited PFF (i.e., erf(x) ti $x + x^* Q_1(z)^* Q_2(z)$) by the erf approximation device (300) to obtain the approximate solution for the error function with an argument of 0.72. The obtained approximation for erf(0.72) is roughly equal to 0.6914. One of ordinary skill in the art, having the benefit of this disclosure, will recognize that the approximated solution of 0.6914 has been rounded for the sake of brevity. The result 0.6914 indicates the probability that a given measurement taken of length of a population member will be between zero and 0.72.

Once the result 0.6914 has been obtained, the function approximation module next stores the result in the results store (not shown), which may be included in the function approximation repository (310). After the result has been stored, it is then provided to the statistical analysis entity via the IO module (304).

Figure 4:
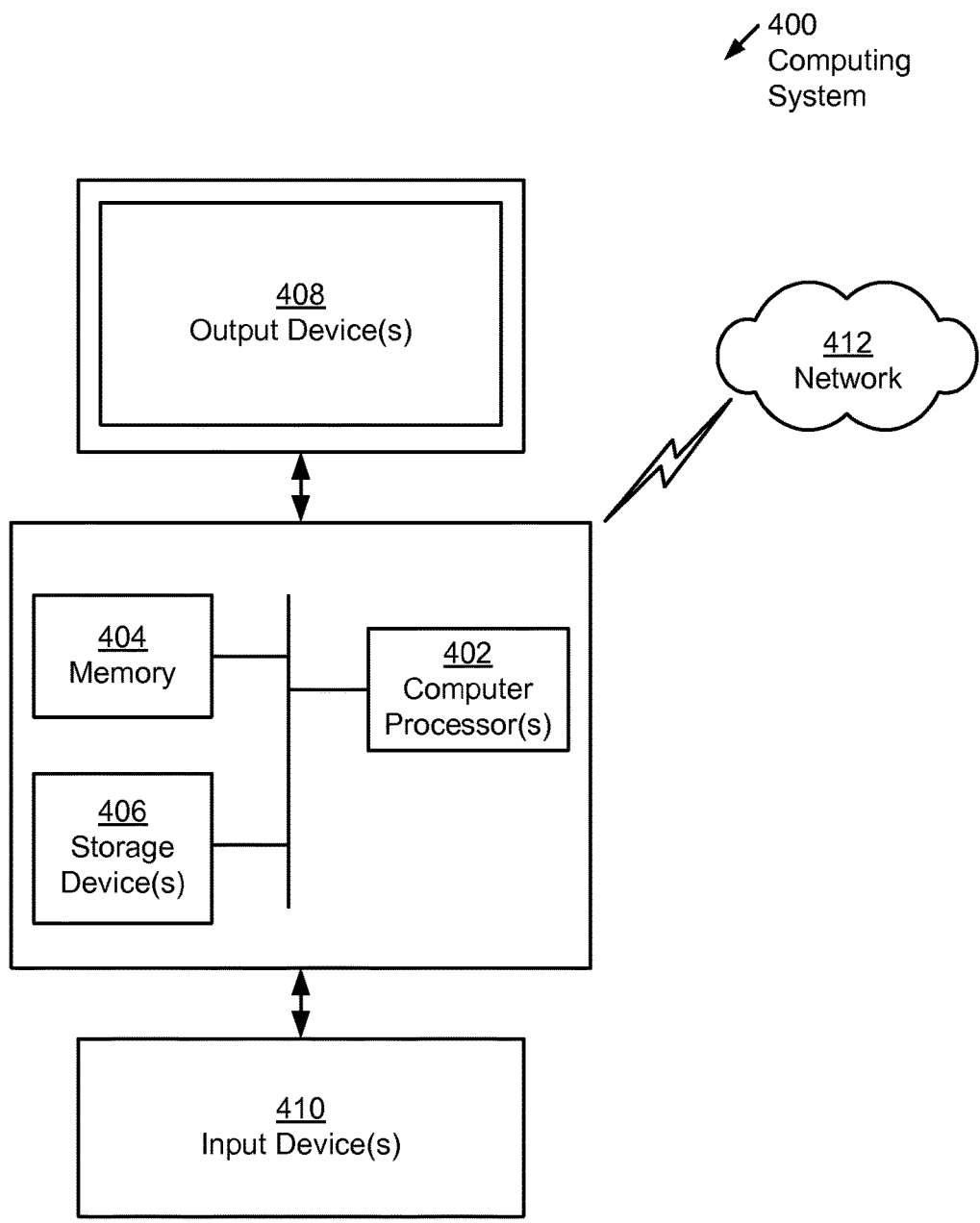
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One of ordinary skill in the relevant art, having the benefit of this disclosure, will recognize that the direction of factors of a PFF to be executed via different processors will have a tangible effect of increasing the speed at which functions may be approximated, and that the use of polynomials to approximate functions may avoid the need to perform division, thereby taking advantage of fast add/multiply features of modern processors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for approximating a function comprising:
a function approximation repository comprising:
a hybrid lookup table configured to store a plurality of coefficients associated with a plurality of polynomials in factored form (PFFs); and
a results store configured to store a plurality of results; and
a function approximation device comprising a first processor, a second processor, a memory, an input/output (TO) module and a function approximation module configured to:
receive a request to approximate the function for an argument from a requesting entity;
verify that the argument falls within a function interval comprising a plurality of subintervals;
perform a determination to find a subinterval of the plurality of subintervals in which the argument falls;
select, based on the determination, a PFF associated with the subinterval,
obtain PFF coefficients associated with the PFF from the hybrid lookup table;
evaluate the PFF using the PFF coefficients and the argument to obtain a result;
store the result in the results store; and
return the result as an answer to the requesting entity via the IO module.

2. The system of claim 1, wherein the function is a trigonometric function.

3. The system of claim 1, wherein the function approximation module, before receiving a request to calculate the function for the argument, is further configured to:
determine the function for which the function approximation module is to be configured;
select, based on the function, the function interval, wherein the function interval represents a range of arguments over which the function approximation module is capable of approximating the function;
select, based on the function, the plurality of subintervals within the function interval;
select the plurality of PFFs associated with the plurality of subintervals, wherein each subinterval of the plurality of subintervals is associated with one PFF of the plurality of PFFs;
calculate the plurality of coefficients for each PFF of the plurality of PFF; and
store the plurality of coefficients in the hybrid lookup table.

4. The system of claim 3, wherein the function approximation module is further configured to calculate the plurality of coefficients using a Remez algorithm.

5. The system of claim 3, wherein each PFF of the plurality of PFFs are of a same degree.

6. The system of claim 1, wherein the PFF comprises a plurality of factors, and wherein the function approximation module is further configured to:
evaluate the PFF by calculating a first factor of the plurality of factors using the first processor to obtain a first factor result;
concurrently calculating a second factor of the plurality of factors using the second processor to obtain a second factor result; and
multiplying the first factor result and the second factor result to obtain at least a portion of the answer.

7. The system of claim 1, wherein the function is one selected from a group consisting of an error function and a complementary error function.

8. The system of claim 1, wherein the answer comprises a maximum error measured via units-in-the-last-place (ULPs).

9. A non-transitory computer readable medium comprising instructions which, when executed by a processor, cause the processor to:
configure a function approximation module of a function approximation device to approximate a result and return the result as an answer to a request to approximate a function for an argument;
receive at the function approximation module, from a requesting entity, the request to approximate the function for the argument;
verify, by the function approximation module, that the argument falls within a function interval comprising a plurality of subintervals;
perform, by the function approximation module, a determination to find a subinterval of the plurality of subintervals in which the argument falls;
select, by the function approximation module and based on the determination, a polynomial in factored form (PFF) associated with the subinterval;
obtain PFF coefficients associated with the PFF from a hybrid lookup table;
evaluate the PFF using the PFF coefficients and the argument to obtain a result, wherein a first factor of the PFF is evaluated using a first processor of the function approximation device to obtain a first factor result, a second factor of the PFF is evaluated using a second processor of the function approximation device to obtain a second factor result, and the first factor result is multiplied by the second factor result to obtain the result;
store the result in a function approximation repository; and
return the result to the requesting entity as the answer via an input/output (TO) module.

10. The non-transitory computer readable medium of claim 9, further comprising instructions that, before receiving the request to approximate the function for the argument, cause the processor to:
determine the function for which the function approximation module is to be configured;
select, based on the function, the function interval, wherein the function interval represents a range of arguments over which the function approximation module is capable of approximating the function;
select, based on the function, the plurality of subintervals within the function interval;
select a plurality of PFFs associated with the plurality of subintervals, wherein each subinterval of the plurality of subintervals is associated with one PFF of the plurality of PFFs;
calculate a plurality of coefficients for each PFF of the plurality of PFFs; and
store the plurality of coefficients in the hybrid lookup table.

11. The non-transitory computer readable medium of claim 10, further comprising instructions which, when executed, cause the processor to use a Remez algorithm to calculate the plurality of coefficients.

12. The non-transitory computer readable medium of claim 10, wherein each PFF of the plurality of PFFs are of a same degree.

13. The non-transitory computer readable medium of claim 9, wherein the first factor and the second factor are evaluated in parallel.

14. The non-transitory computer readable medium of claim 9, wherein the function is one selected from a group consisting of an error function and a complementary error function.

15. The non-transitory computer readable medium of claim 9, wherein the function is a trigonometric function.

16. The non-transitory computer readable medium of claim 9, wherein the answer comprises a maximum error measured via units-in-the-last-place (ULPs).

17. A method for approximating a function comprising:
configuring a function approximation module of a function approximation device to approximate a result and return the result as an answer to a request to approximate the function for an argument;
receiving at the function approximation module, from a requesting entity, the request to approximate the function for the argument;
verifying, by the function approximation module, that the argument falls within a function interval comprising a plurality of subintervals;
performing, by the function approximation module, a determination to find a subinterval of the plurality of subintervals in which the argument falls;
selecting, by the function approximation module and based on the determination, a polynomial in factored form (PFF) associated with the subinterval;
obtaining PFF coefficients associated with the PFF from a hybrid lookup table;
evaluating the PFF using the PFF coefficients and the argument to obtain a result, wherein a first factor of the PFF is evaluated using a first processor of the function approximation device to obtain a first factor result, a second factor of the PFF is evaluated using a second processor of the function approximation device to obtain a second factor result, and the first factor result is multiplied by the second factor result to obtain the result;
storing the result in a function approximation repository; and
returning the result to the requesting entity as the answer via an input/output (TO) module.

18. The method of claim 17, wherein, before receiving the request to approximate the function, configuring the function approximation module comprises:
determining the function for which the function approximation module is to be configured;
selecting, based on the function, the function interval, wherein the function interval represents a range of arguments over which the function approximation module is capable of approximating the function;
selecting, based on the function, the plurality of subintervals within the function interval;
selecting a plurality of PFFs associated with the plurality of subintervals, wherein each subinterval of the plurality subintervals is associated with one PFF of the plurality of PFFs;
calculating a plurality of coefficients for each PFF of the plurality of PFFs; and
storing the plurality of coefficients in the hybrid lookup table.

19. The method of claim 17, wherein the first factor and the second factor are evaluated in parallel.

20. The method of claim 17, wherein the function is one selected from a group consisting of an error function and a complementary error function.

* * * * *

UNITED STATES PATENT AND TRADEMARK OFFICE
CERTIFICATE OF CORRECTION

PATENT NO. : 9,772,975 B2  
APPLICATION NO. : 14/790852  
DATED : September 26, 2017  
INVENTOR(S) : Ng Page 1 of 1

It is certified that error appears in the above-identified patent and that said Letters Patent is hereby corrected as shown below:

On page 2, Column 1, under Other Publications, Line 2, delete "Comlementary" and insert -- Complementary --, therefor.

In Column 11, Line 13, delete "$Q_2(x)=A_6+A_7z+A_8z^2\ A_9z^3A_{10}z^4+z^5$" and insert -- $Q_2(x)=A_6+A_7z+A_8z^2+A_9z^3+A_{10}z^4+z^5$ --, therefor.

In Column 11, Line 40, delete "erf(x) ti $x+x*Q_1(z)*Q_2(z))$" and insert -- erf(x)≈$x+x*Q_1(z)*Q_2(z))$ --, therefor.

In Column 13, Line 11, in Claim 1, delete "(TO)" and insert -- (IO) --, therefor.

In Column 14, Line 37, in Claim 9, delete "(TO)" and insert -- (IO) --, therefor.

In Column 16, Line 8, in Claim 17, delete "(TO)" and insert -- (IO) --, therefor.

Signed and Sealed this  
Twenty-second Day of May, 2018

Andrei Iancu  
*Director of the United States Patent and Trademark Office*